(12) United States Patent
Wen et al.

(10) Patent No.: US 7,480,020 B2
(45) Date of Patent: Jan. 20, 2009

(54) TRANSFLECTIVE LIQUID CRYSTAL DISPLAY AND METHOD OF FABRICATING THE SAME

(75) Inventors: Chi-Jain Wen, Hsinchu (TW); Dai-Liang Ting, Hsinchu (TW); Gwo-long Lin, Hsinchu (TW); Shyuan-Jeng Ho, Hsinchu (TW); I-Wei Wu, Hsinchu (TW)

(73) Assignee: TPO Displays Corp., Chu-Nan (TW)

( * ) Notice: Subject to any disclaimer, the term of this patent is extended or adjusted under 35 U.S.C. 154(b) by 462 days.

(21) Appl. No.: 10/942,683

(22) Filed: Sep. 16, 2004

(65) Prior Publication Data
US 2005/0213002 A1  Sep. 29, 2005

(30) Foreign Application Priority Data
Mar. 24, 2004  (TW)  .............................. 93107899 A

(51) Int. Cl.
*G02F 1/1335* (2006.01)
(52) U.S. Cl. ..................... 349/114; 349/113; 349/47
(58) Field of Classification Search .............. 349/114, 349/113, 42–43, 46–47
See application file for complete search history.

(56) References Cited

U.S. PATENT DOCUMENTS

| | | | |
|---|---|---|---|
| 4,035,529 A | 7/1977 | Meisert et al. | 427/244 |
| 4,264,291 A | 4/1981 | Hoffmann et al. | 425/224 |
| 4,925,719 A | 5/1990 | Staneluis et al. | 428/71 |
| 5,471,330 A * | 11/1995 | Sarma | 349/43 |
| 5,856,371 A | 1/1999 | Grimm et al. | 521/159 |
| 6,042,765 A | 3/2000 | Sugahara et al. | 264/46.1 |
| 6,228,296 B1 | 5/2001 | Cartmill et al. | 264/46.2 |
| 6,466,280 B1 * | 10/2002 | Park et al. | 349/43 |
| 6,809,785 B2 * | 10/2004 | Fujino | 349/114 |
| 6,850,298 B2 * | 2/2005 | Fujimori et al. | 349/114 |
| 6,914,656 B2 * | 7/2005 | Sakamoto et al. | 349/141 |
| 7,002,651 B2 * | 2/2006 | Ha et al. | 349/114 |
| 7,012,656 B2 * | 3/2006 | Murade | 349/43 |
| 7,298,430 B2 * | 11/2007 | Nishino et al. | 349/38 |

(Continued)

FOREIGN PATENT DOCUMENTS

DE  1 167 520  4/1964

(Continued)

OTHER PUBLICATIONS

Patent Abstracts of Japan Bd. 0071, Nr. 73 (M-232), Jul. 30, 1983 & JP 58 076239 A (Matsushita Denko KK), May 9, 1983 (Jul. 30, 1983).

(Continued)

*Primary Examiner*—David Nelms
*Assistant Examiner*—Thanh-Nhan P Nguyen
(74) *Attorney, Agent, or Firm*—Liu & Liu

(57) ABSTRACT

A transflective liquid crystal display and method of fabricating the same. The pixel region of the transflective comprises a thin film transistor, a transmissive electrode, and a reflective electrode, wherein the overlap of the reflective electrode and the transparent electrode composes a reflective region and the non-overlapping region of the reflective electrode and the transparent electrode form a transmissive region, and the transparent electrode and the source and the drain regions of the thin film transistor are formed of the same silicon layer.

22 Claims, 15 Drawing Sheets

U.S. PATENT DOCUMENTS

| | | | |
|---|---|---|---|
| 2002/0044240 | A1 | 4/2002 | Choo |
| 2003/0071944 | A1 | 4/2003 | Baek |
| 2004/0114077 | A1* | 6/2004 | Chen et al. .................. 349/114 |
| 2004/0239846 | A1* | 12/2004 | Wen et al. ................... 349/114 |
| 2005/0001960 | A1* | 1/2005 | Kim et al. ................... 349/114 |
| 2005/0052591 | A1* | 3/2005 | Joten ............................ 349/98 |

FOREIGN PATENT DOCUMENTS

| | | |
|---|---|---|
| DE | 23 30 678 | 1/1975 |
| FR | 2003281 | 11/1969 |
| GB | 1 369 641 | 10/1974 |
| WO | 00/03858 | 1/2000 |

OTHER PUBLICATIONS

Gellhorn Van E: "Sandwich Structure Success Depends on Process Conformity with Requirements" Composites Manufacturing, Butterworth Scientific, Guildford, Surrey, GB, Bd. 3, Nr. 3, Jan. 1992, Seiten 183-188, XP000349832.

* cited by examiner

TRANSFLECTIVE LIQUID CRYSTAL DISPLAY AND METHOD OF FABRICATING THE SAME

BACKGROUND OF THE INVENTION

1. Field of the Invention

The present invention relates to a transflective liquid crystal display (LCD), and more particularly, to a method for fabricating a transflective liquid crystal display using a silicon layer as transparent electrode of the transmissive region.

2. Description of the Related Art

Conventional transmissive type liquid crystal displays, comprise a backlight, suffer low image contrast when the environment is bright. That is, the color reproducibility is lower and the display is not sufficiently recognizable because the ambient light is brighter than a backlight of the display. Moreover, use of the backlight increases power consumption. Conversely, reflective type liquid crystal displays comprise a reflector formed on one of a pair of substrates rather than a backlight so that ambient light is reflected from the surface of the reflector. The method is disadvantageous, however, in that the display is less visible when the surrounding environment is dark.

In order to overcome the aforementioned problems, a display which realizes both a transmissive mode and a reflective mode in one liquid crystal display device has been disclosed in, for example, U.S. Pat. No. 6,195,140, the entirety of which is hereby incorporated by reference. Such a liquid crystal display device employs indium tin oxide (ITO) to serve as a transparent electrode and an upper electrode of a capacitor. FIG. 1A is a cross section of a conventional transflective liquid crystal display. FIG. 1B is the schematic arrangement of the transparent electrode and the reflective electrode of a conventional transflective liquid crystal display, wherein FIG. 1A is a cross section of the transflective liquid crystal display 10 taken along line I-I" of FIG. 1B.

Conventional transflective liquid crystal displays, such as transflective thin film transistor liquid crystal displays (TFT-LCDs) comprise a bottom gate thin film transistor and a transparent electrode made of indium tin oxide (ITO). The fabrication processes are complicated and require excessive lithography steps and thus result in increased cost and lower production yield.

Referring to FIG. 1A, a transflective TFT-LCD device 10 comprises a lower substrate 12, an upper substrate 14, and a liquid crystal layer 16, wherein the lower substrate 12 serves as an active matrix substrate 12 and the upper substrate 14 serves as a color filter substrate 14 having a common electrode on its inner side. In FIG. 1B, a plurality of pixel areas are formed on the active matrix substrate 12. The pixel areas are defined by transverse scan lines 18 and longitudinal data lines 20. Each pixel area comprises a thin film transistor 20, a capacitor 30, a transmissive region T, and a reflective region R.

A first metal layer is formed on the lower substrate 12. The first metal layer is lithographically etched so as to define scan lines 18, a storage capacitor electrode 18a and a gate electrode 18b. A gate insulating layer 19 is formed on the lower substrate 12 covering the patterned first metal layer. A TFT island structure comprising a silicon layer 21, a channel protective layer 22, a source electrode 23a, and a drain electrode 23b is formed. A first ITO layer 24 and a second metal layer 25 are sequentially deposited and patterned into a predetermined shape to form the data lines 26. A portion of the first ITO 24a covers the storage capacitor electrode 18a to serve as a top electrode of the capacitor. One end of the first ITO layer 24a and the second metal layer 25b is formed on the source electrode 23b to serve as connecting electrodes 28. An insulating layer 29 having a contact hole 33 is formed on the resultant substrate 12. A second ITO layer 32 and a third metal layer 34 are subsequently deposited and patterned on the insulating layer 29. The second ITO layer 32 and the third metal layer 34 in the pixel area serve as pixel electrode P, wherein the overlap of the second ITO layer 32 and the third metal layer 34 forms a reflective region R, and the second ITO layer 32 not covered by the third metal layer 34 forms a transmissive region T. Moreover, the pixel electrode P is electrically connected to the respective capacitor 30 via the contact holes 33, while the capacitor 30 is electrically connected to the source electrode 23b via the connecting electrode 28.

The aforementioned electrode structure, however, is disadvantageous in that the capacitor 30 and the pixel electrode P are formed in different lithographical steps. As a result, more masks and lithographical steps are needed to define the first ITO layer 24 and the second ITO layers 32 leading to higher production cost and lower yield.

U.S. Pat. No. 6,331,100, the entirety of which is hereby incorporated by reference, describes another conventional transflective LCD device. A reflective electrode is directly formed on the lower substrate. A color filter and a transparent electrode are subsequently formed on the resultant substrate. By providing the reflective electrode with apertures, the area of the reflective region and transmissive region can be adjusted. FIG. 2 shows a cross section of another conventional transflective LCD device.

In FIG. 2, a transflective LCD device 40 comprises a lower substrate 42, an upper substrate 44, and a liquid crystal layer 46. An opaque metal layer 48, a color filter 50 and a transparent metal layer 52 are sequentially formed on the inner side of the lower substrate 42. A common electrode 54 is formed on the inner side of the upper substrate 44. The opaque metal layer 48 includes a plurality of apertures 49. The overlap of the opaque metal layer 48 and a transparent metal layer 52 forms a reflective region, and the transparent metal layer 52 not covered by the opaque metal layer 48 forms a transmissive region. The described related art still requires an ITO layer to serve as a transparent electrode. Therefore, an extra lithograpgy step is still required to pattern the ITO layer.

SUMMARY OF THE INVENTION

The present invention ameliorates the disadvantages associated with the related art and achieves other advantages not realized by the related art.

An aspect of the present invention is to provide a method for fabricating a transflective LCD using a silicon layer as a transparent electrode of the transmissive region.

In order to achieve this aspect, the present invention provides a transflective liquid crystal display comprising a lower substrate and an upper substrate opposing each other, a liquid crystal layer interposed between the upper and lower substrates, a plurality of scan lines and a plurality of intersecting data lines defining a pixel region on the lower substrate, a thin film transistor (TFT) device comprising a gate, a source and a drain regions on the lower substrate, a transparent electrode formed in the pixel region on the lower substrate, and a reflective electrode formed over a portion of the transparent electrode, wherein the overlap of the reflective electrode and the transparent electrode composes a reflective region and the non-overlapping reflective electrode and the transparent electrode comprise a transmissive region, and wherein the transparent electrode comprises a silicon layer.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The present invention is directed to a transflective LCD device and a method of fabricating the same, for example, a transflective thin film transistor liquid crystal display (TFT-LCD). The thin film transistor can be a top gate thin film transistor with a silicon layer serving as a transparent electrode. The silicon layer can be polysilicon or amorphous silicon. The silicon layer can be doped silicon or undoped silicon. The silicon layer serves as an active layer, e.g., a source region of the thin film transistor. The transparent electrode can connect to the active layer of the thin film transistor. The present invention uses a silicon layer to form a transparent electrode and an active layer of a thin film transistor. A conventional ITO layer is not necessary, thus reducing the number of required lithography steps.

Reference will now be made in detail to the preferred embodiment of the present invention, on example of which is illustrated in the accompanying drawings.

First Embodiment

Figure 1A:
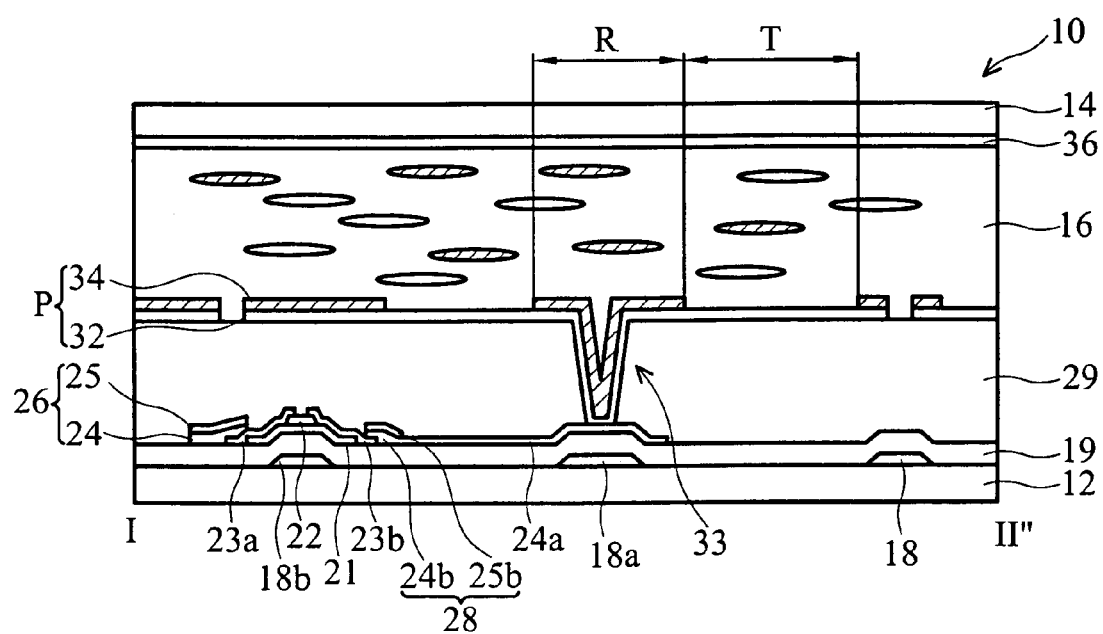
FIG. 1A is a cross section of a conventional transflective liquid crystal display.
Figure 1B:
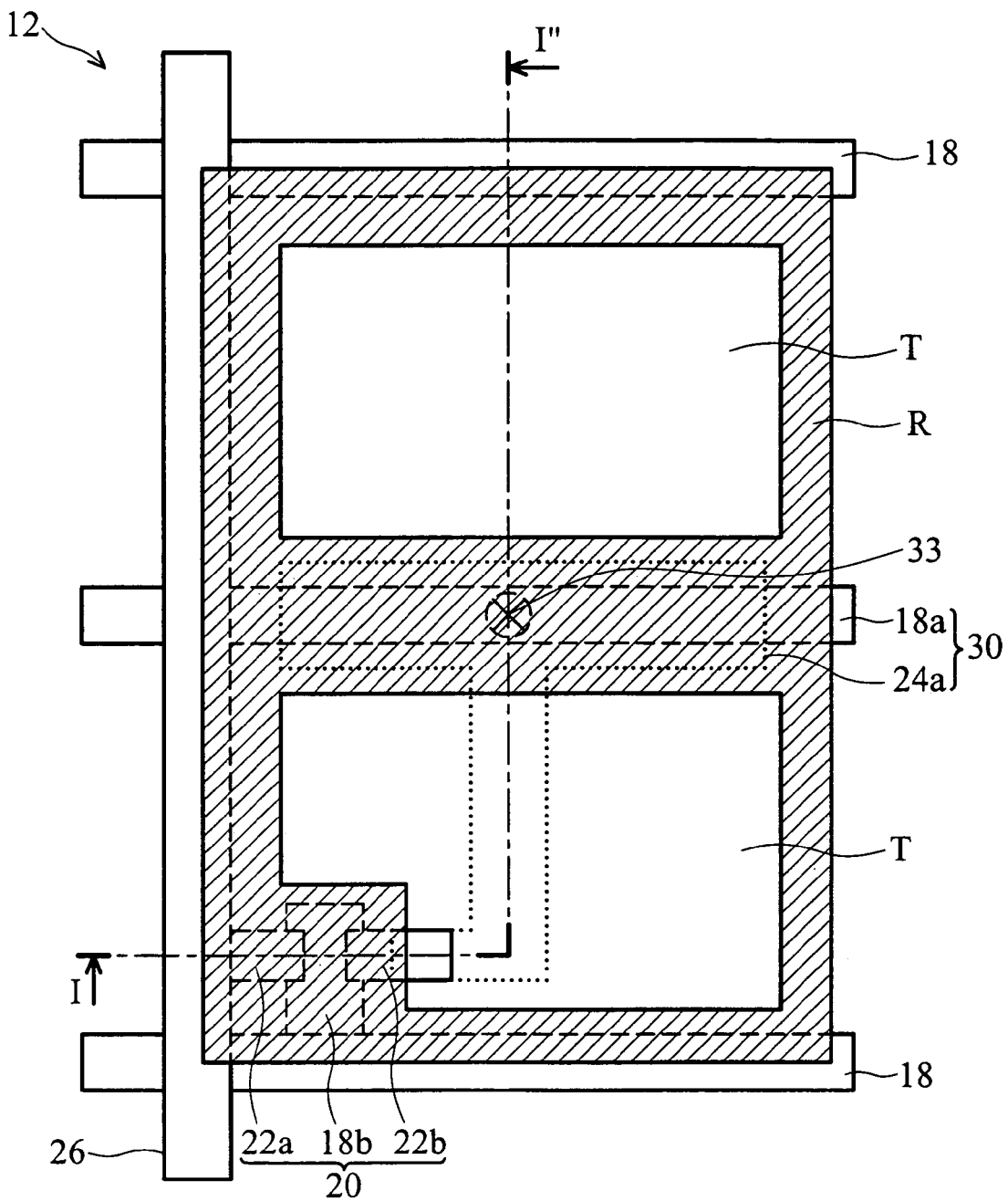
FIG. 1B is a plane view of the transparent electrode and the reflective electrode of a conventional transflective liquid crystal display.
Figure 2:
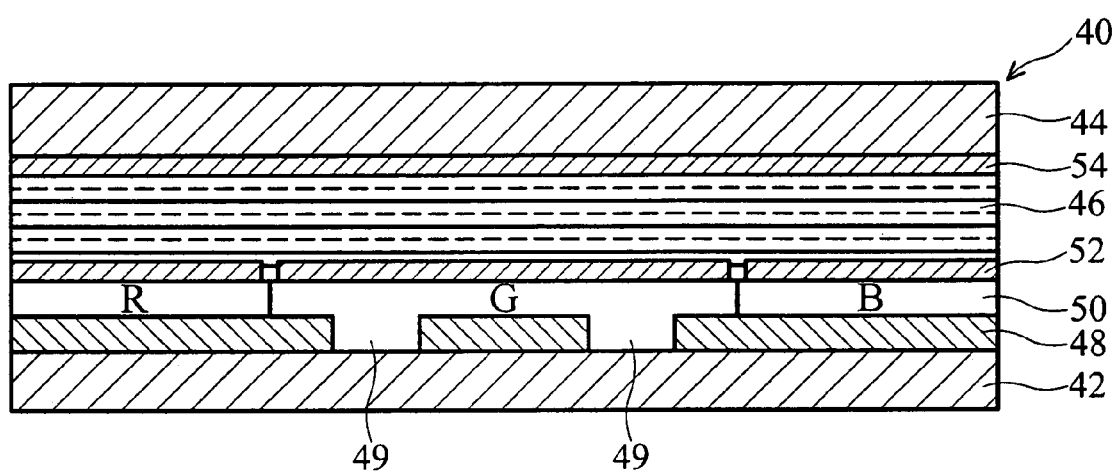
FIG. 2 is a cross section of another conventional transflective LCD device.
Figure 3A:
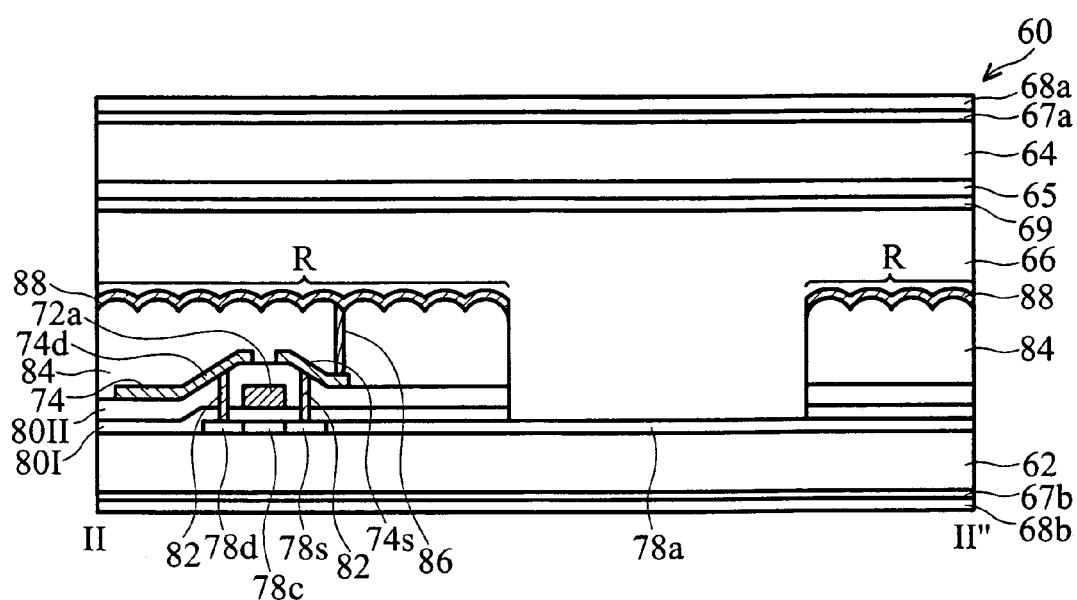
FIG. 3A is a cross section of the transflective liquid crystal display in accordance with a first embodiment of the present invention.
Figure 3B:
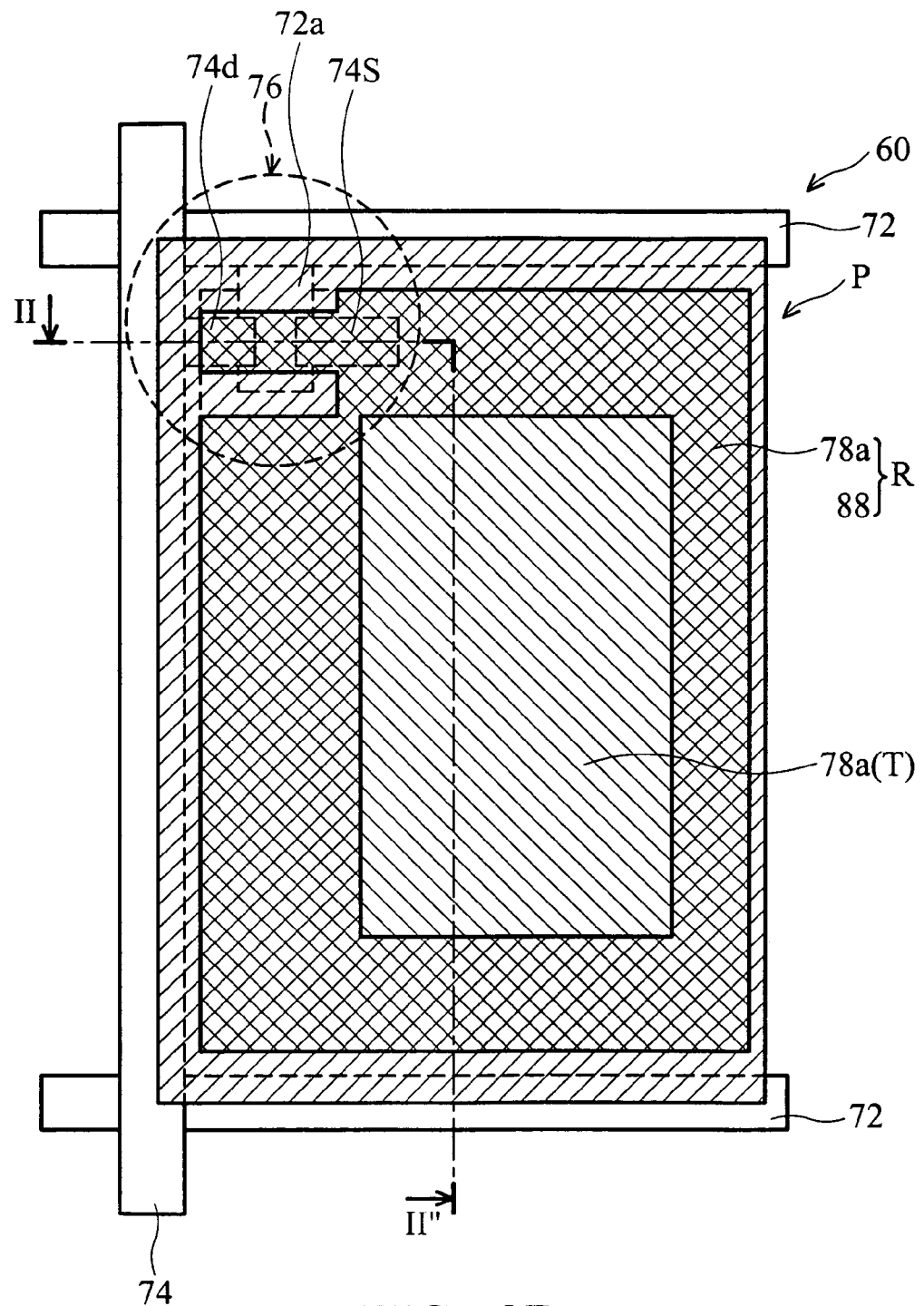
FIG. 3B is a plane view of the TFT substrate of the transflective liquid crystal display in accordance with a first embodiment of the present invention.

FIG. 3A shows a cross section of a transflective liquid crystal display 60 according to a first embodiment of the present invention. FIG. 3B shows a schematic view of an arrangement of the transparent electrode and the reflective electrode of a TFT substrate according to a first embodiment of the present invention, wherein FIG. 3A is taken along line I-I" of FIG. 3B.

Referring to FIG. 3A, a transflective TFT-LCD device 60 comprises a lower substrate 62, an upper substrate 64, and a liquid crystal layer 66, wherein the lower substrate 62 is used as an active matrix substrate 62 and the upper substrate 64 is used as a color filter substrate 64. A first phase retardation film 67a and a first polarizer 68a are separately formed on the outer side of the upper substrate 64, a color filter 65 and a common electrode 69 are formed on the inner side of the upper substrate 64. A second phase retardation film 67b and a second polarizer 68b are separately formed on the outer side of the lower substrate 62, and a TFT, a transparent electrode 78a and a reflective electrode 88 are formed on the inner side of the lower substrate 62.

Referring to FIG. 3B, a plurality of pixel areas P are formed on the active matrix substrate 62. The pixel areas P are defined by transverse scan lines 72 and longitudinal data lines 74. Each pixel area P comprises a thin film transistor 76, a transmissive region T, and a reflective region R.

The fabrication method for the aforementioned electrode structure of the transflective LCD device 60 is shown in FIGS. 3A and 3B. A silicon layer 78 is formed on the lower substrate 62. The silicon layer 78 is then patterned into a rectangular area corresponding to the pixel area P. The silicon layer 78 preferably comprises polysilicon or amorphous silicon. A first insulating layer 80I and a first conductive layer are sequentially formed on the lower substrate 62. The first conductive layer is patterned into scanning lines 72 and a gate electrode 72a. The gate electrode 72a is a perpendicular branch of the scan line 72 adjacent to the intersection of the scan line 72 and data line 74. The first insulating layer 80I preferably comprises a silicon oxide layer, a silicon nitride layer, or combinations thereof. The first conductive layer can be a metal layer (e.g., Al) or a polysilicon layer.

Ion implantation is performed using the gate electrode 72a as a mask to create a doped silicon layer. Both sides of the gate electrode 72a form a source region 78s and a drain region 78d. The undoped silicon layer 78 underneath the gate electrode is used as a channel 78c. The doped silicon outside of the TFT 76 area is used as a transparent electrode 78a.

A second insulating layer 80II is formed on the lower substrate 62. The second insulating layer 80II preferably includes a silicon oxide layer, a silicon nitride layer, or combinations thereof. Two first contact plugs 82 are inserted on both sides of the gate electrode 72a perforating the second insulating layer 80II and the first insulating layer 80I, connecting to the source region 78s and the drain region 78d separately.

A second conductive layer is formed on the second insulating layer 80II. The second conductive layer is then patterned into a data line 74, a source electrode 74s, and a drain electrode 74d. The drain electrode 74d is a perpendicular branch of the data line 74 electrically connecting to the drain region 78d via the first contact plug 82. The source electrode 74s is separated from the drain electrode 74d by a predetermined distance and electrically connects to the source region 78s via the first contact plug 82.

A passivation insulating layer 84 is formed on the lower substrate 62. A second contact plug 86 is inserted in the passivation insulating layer 84 connecting the source electrode 74s. A third conductive layer is formed on the passivation insulating layer 84 and then patterned into a reflective electrode 88. A portion of the passivation insulating layer 84, second insulating layer 80II, and first insulating layer 80I are lithographically etched exposing the transparent electrode 78a. As such, the exposed transparent electrode 78a is used as a transmissive region T, while the patterned reflective electrode 86 is used as a reflective region R.

The passivation insulating layer 84 preferably includes a silicon oxide, a silicon nitride, an organic insulating layer or a photo resist layer. The reflective electrode 88 can be an opaque metal layer, such as an aluminum or silver layer. A surface treatment can be performed on the passivation insulating layer 84 to improve the optic effect of the reflective region R. The surface treatment preferably comprises exposure, developing, etching, heat treatment, and annealing steps. The surface of the resultant passivation insulating layer 84 is wavy.

In accordance with the aforementioned transflective LCD device 60 and fabricating method, the silicon layer 78 is used as transparent electrode 78a, source region 78s, and drain region 78d, and the conventional fabrication method of the ITO layer can thus be omitted. Production and fabrication cost problems can also be improved.

Second Embodiment

Figure 4:
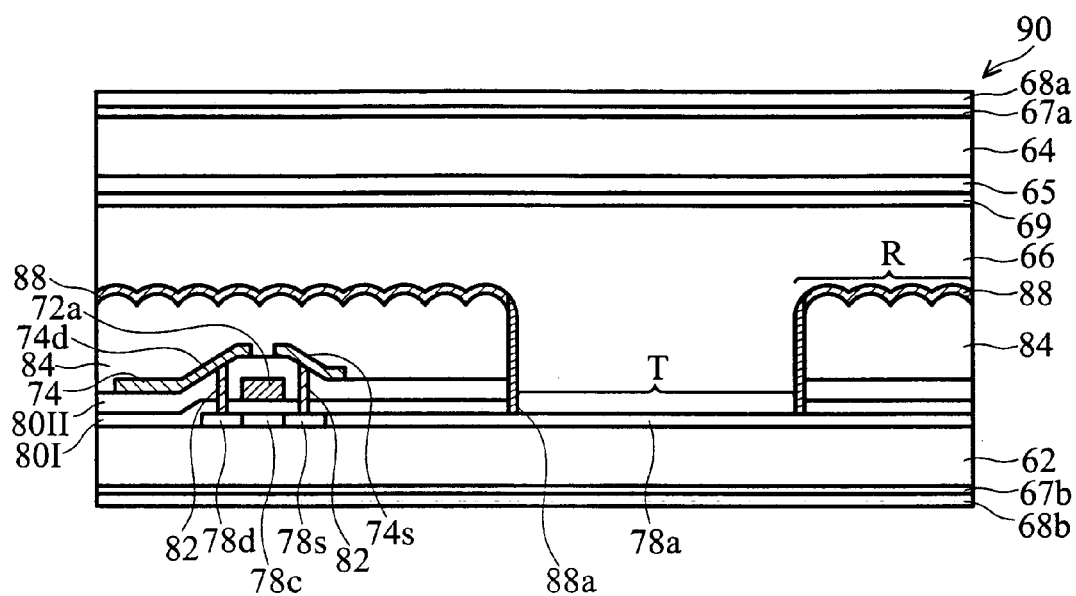
FIG. 4 is a cross section of the transflective liquid crystal display in accordance with a second embodiment of the present invention.

FIG. 4 is a cross section of the transflective liquid crystal display 90 in accordance with a second embodiment of the present invention. The transflective TFT-LCD device 90 is nearly identical to the transflective TFT-LCD device 60 of the first embodiment and for simplicity its detailed description is omitted. The second embodiment is different from the first embodiment in that the reflective electrode 88 electrically connects the source electrode 74s via the second contact plug 86 in accordance with the first embodiment, while an alternative reflective electrode 88 comprising an extension 88a electrically connects the transparent electrode 78a via the sidewall of the passivation insulating layer 84. A portion of the passivation insulating layer 84, the second insulating layer 80II, and the first insulating layer 80I are sequentially lithographically etched and the exposed transparent electrode 78a is used as a transmissive region T. Thereafter, the reflective electrode 88 is deposited and patterned on the top and sidewall of the passivation insulating layer 84 electrically connecting the transparent electrode 78a.

Third Embodiment

Figure 5A:
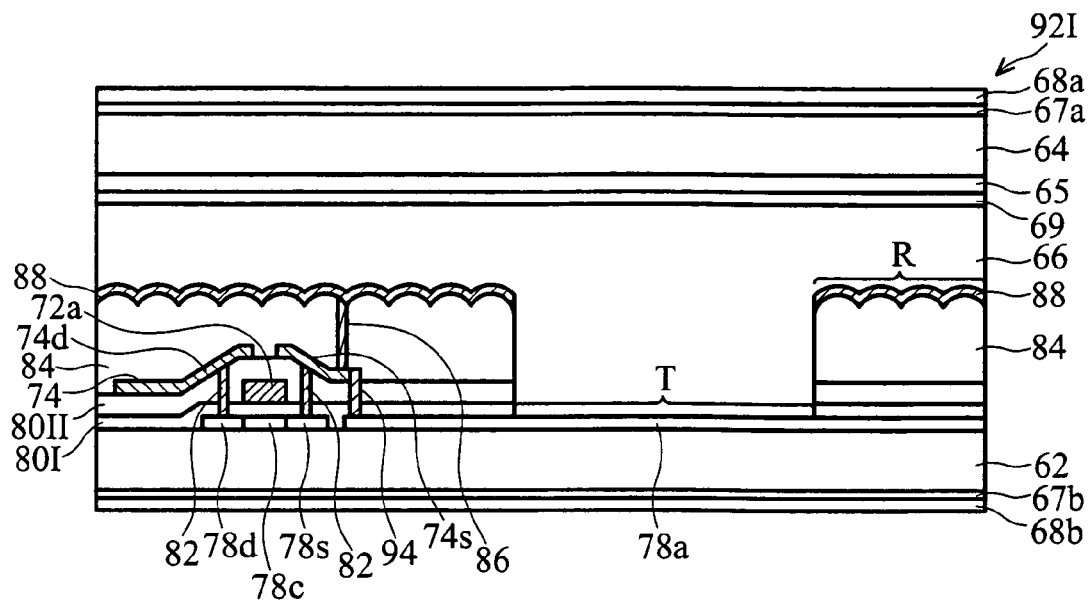
FIG. 5A is a cross section of a first transflective liquid crystal display in accordance with a third embodiment of the present invention.

FIG. 5A shows a cross section of a transflective liquid crystal display 92I in accordance with a third embodiment of the present invention. The transflective TFT-LCD device 92I as shown in FIG. 5A is nearly identical to the transflective TFT-LCD device 60 of the first embodiment and for simplicity its detailed description is omitted. The third embodiment is different from the first embodiment in that the transparent electrode 78a connects the source region 78s, and the source region 78s electrically connects the reflective electrode 88 via the first contact plug 82, the source electrode 74s, and the second contact plug 86 in the first embodiment, while the transparent electrode 78a and the active layer of the TFT 76 are separated, and a third contact plug 94 perforate the first insulating layer 80I and the second insulating layer 80II to electrically connect the reflective electrode 88 via the third contact plug 94, the source electrode 74s, and the second contact plugs 86 in a first transflective LCD 92I.

The fabrication method is different in that the silicon layer 78c is patterned into an active layer region and a pixel electrode region, wherein the active layer region is disposed in the TFT 76 comprising the source region 78s, the drain region 78d, and the channel 78, while the pixel electrode region is used as transparent electrode 78a. Furthermore, the second contact plug 86 and the third contact plug 94 can be formed simultaneously and the source electrode 74s is formed connecting the first contact plug 82 and the third contact plug 94.

Figure 5B:
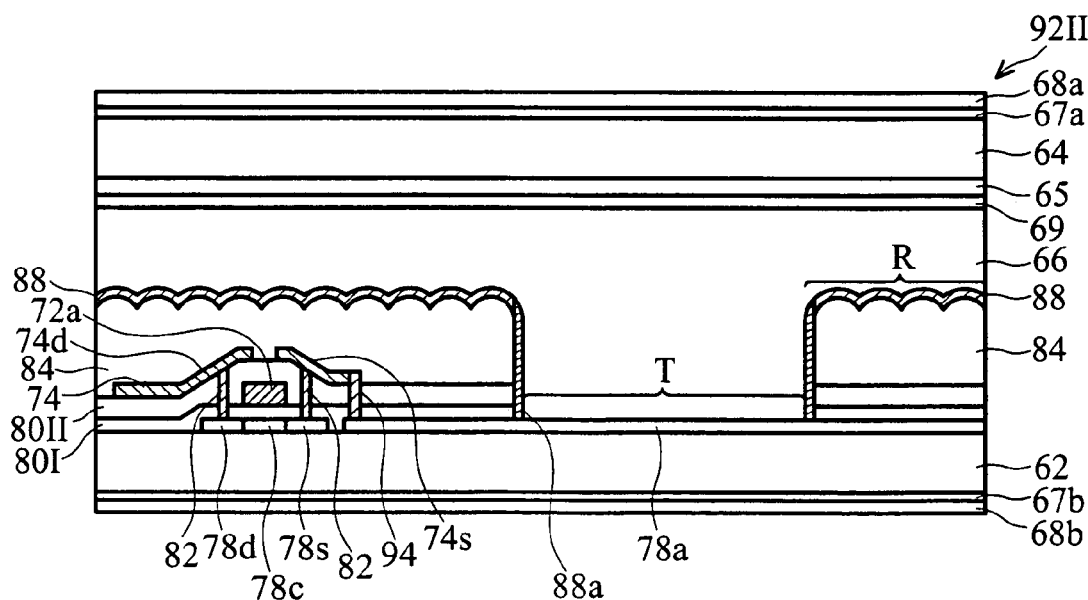
FIG. 5B is a cross section of a second transflective liquid crystal display in accordance with a third embodiment of the present invention.

FIG. 5B is a cross section of another transflective liquid crystal display 92II in accordance with a third embodiment of the present invention. The transflective TFT-LCD device 92II as shown in FIG. 5B is nearly identical to the transflective TFT-LCD device 90 of the second embodiment as shown in FIG. 4 and for simplicity its detailed description is omitted. The third embodiment is different from the second embodiment in that the transparent electrode 78a directly connects the source region 78s and the reflective electrode 88, and the source region 78s connects the source electrode 74s via the first contact plug 82 in the second embodiment, while the transparent electrode 78a and the active layer of the TFT 76 are separated, and a third contact plug 94 perforates the first insulating layer 80I and the second insulating layer 80II, and the transparent electrode 78s can electrically connect the source electrode 74s via the third contact plug 94.

The fabrication method is different in that the silicon layer 78 is patterned into an active layer region and a pixel electrode region, wherein the active layer region is disposed in the TFT 76 comprising the source region 78s, the drain region 78d, and the channel 78c, while the pixel electrode region is used as transparent electrode 78a. Furthermore, the first contact plug 82 and the third contact plug 94 can be formed simultaneously and the source electrode 74s is formed to connect the first contact plug 82 and the third contact plug 94.

Fourth Embodiment

Figure 6A:
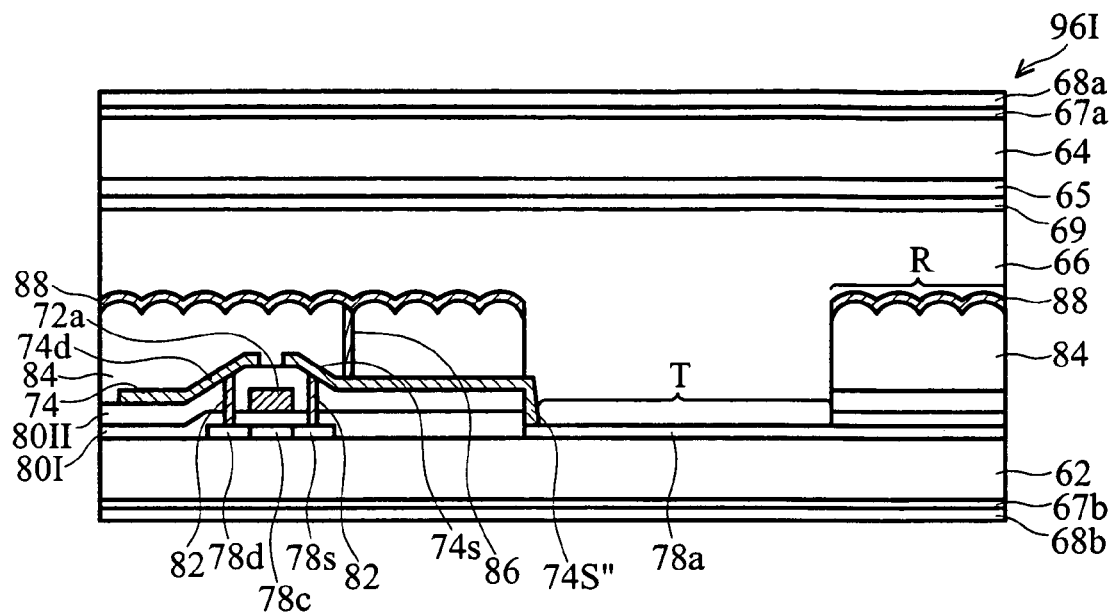
FIG. 6A is a cross section of a first transflective liquid crystal display in accordance with a fourth embodiment of the present invention.

FIG. 6A is a cross section of a transflective liquid crystal display 96I according to a fourth embodiment of the present invention. The transflective TFT-LCD device 96I as shown in FIG. 6A is nearly identical to the transflective TFT-LCD device 92I of the third embodiment and for simplicity its detailed description is omitted. The fourth embodiment is different from the third embodiment in that the transparent electrode 78a connects the reflective electrode 88 via the third contact plug 94, the source electrode 74s, and the second contact plug 86 in the third embodiment, while the third contact plug is omitted, and an extension 74s" of the source electrode 74s is formed on the sidewall of the second insulating layer 80II connecting the transparent electrode 78a, and the transparent electrode 78a connects the reflective electrode 88 via the source electrode 74s and the extension 74s" in the third embodiment.

The fabrication method is different in that the silicon layer 78 is patterned into an active layer region and a pixel electrode region, wherein the active layer region is disposed in the TFT 76 including the source region 78s, the drain region 78d, and the channel 78c, while the pixel electrode region is used as transparent electrode 78a. Furthermore, the third contact plug 94 is omitted. Additionally, the first insulating layer 80I and the second insulating layer 80II are defined into an island prior to forming the second conductive layer. An extension 74s" of the source electrode 74s is formed on the sidewall of the first insulating layer 80I and the second insulating layer 80II electrically connecting transparent electrode 78a.

Figure 6B:
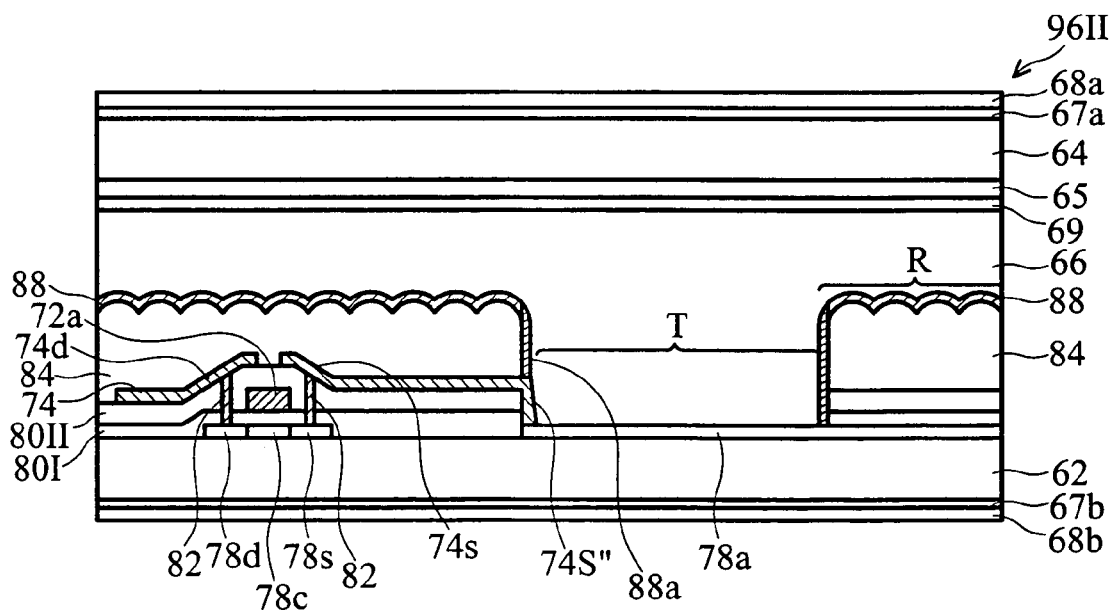
FIG. 6B is a cross section of a second transflective liquid crystal display in accordance with a fourth embodiment of the present invention.

FIG. 6B is a cross section of another transflective liquid crystal display 96II in accordance with a fourth embodiment of the present invention. The transflective TFT-LCD device 96II as shown in FIG. 6B is nearly identical to the transflective TFT-LCD device 92II of the third embodiment as shown in FIG. 5B and for simplicity its detailed description is omitted. The fourth embodiment is different from the third embodiment in that the transparent electrode 78a and the active layer of the TFT 76 are separated in the TFT-LCD 92II according to the third embodiment, while the third contact plug 94 is omitted, and the extension 74s" of source electrode 74s directly connects the transparent electrode 78a. That is, the transparent electrode 78a connects the reflective electrode 88 via the extension 74s" of source electrode 74s. The fabrication method is different in that the silicon layer 78 is patterned into an active layer region and a pixel electrode region, wherein the active layer region is disposed in the TFT 76 comprising the source region 78s, the drain region 78d, and the channel 78c, while the pixel electrode region is used as transparent electrode 78a. Furthermore, the fabrication of the third contact plug 94 can be omitted.

Fifth Embodiment

Figure 7A:
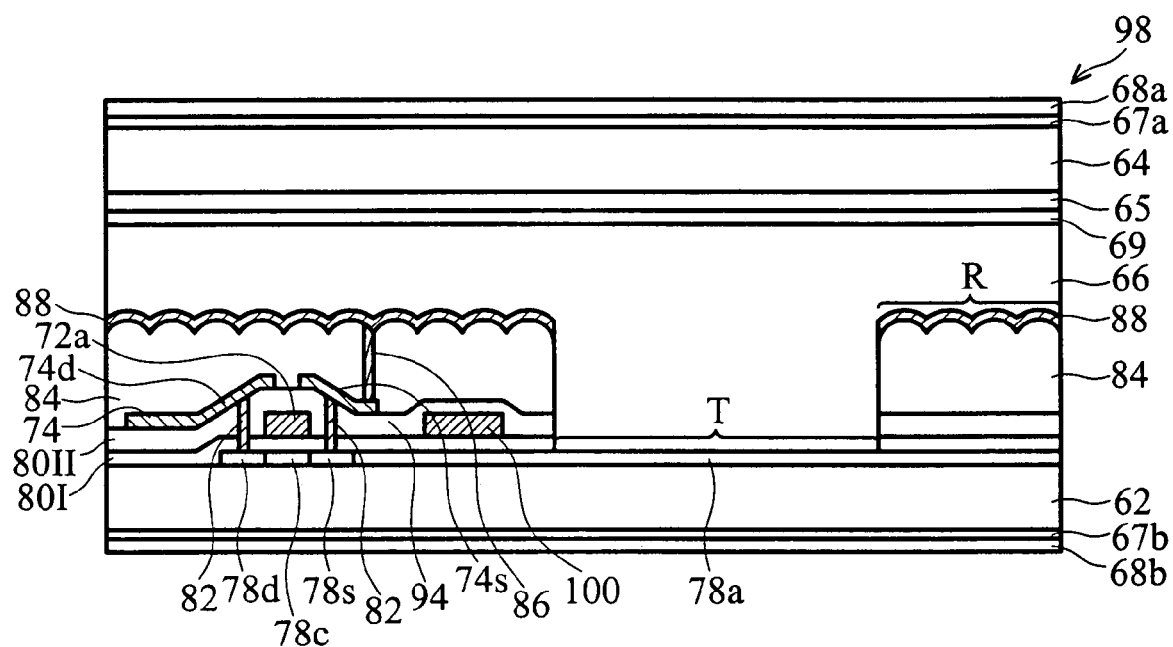
FIG. 7A is a cross section of the transflective liquid crystal display in accordance with a fifth embodiment of the present invention.
Figure 7B:
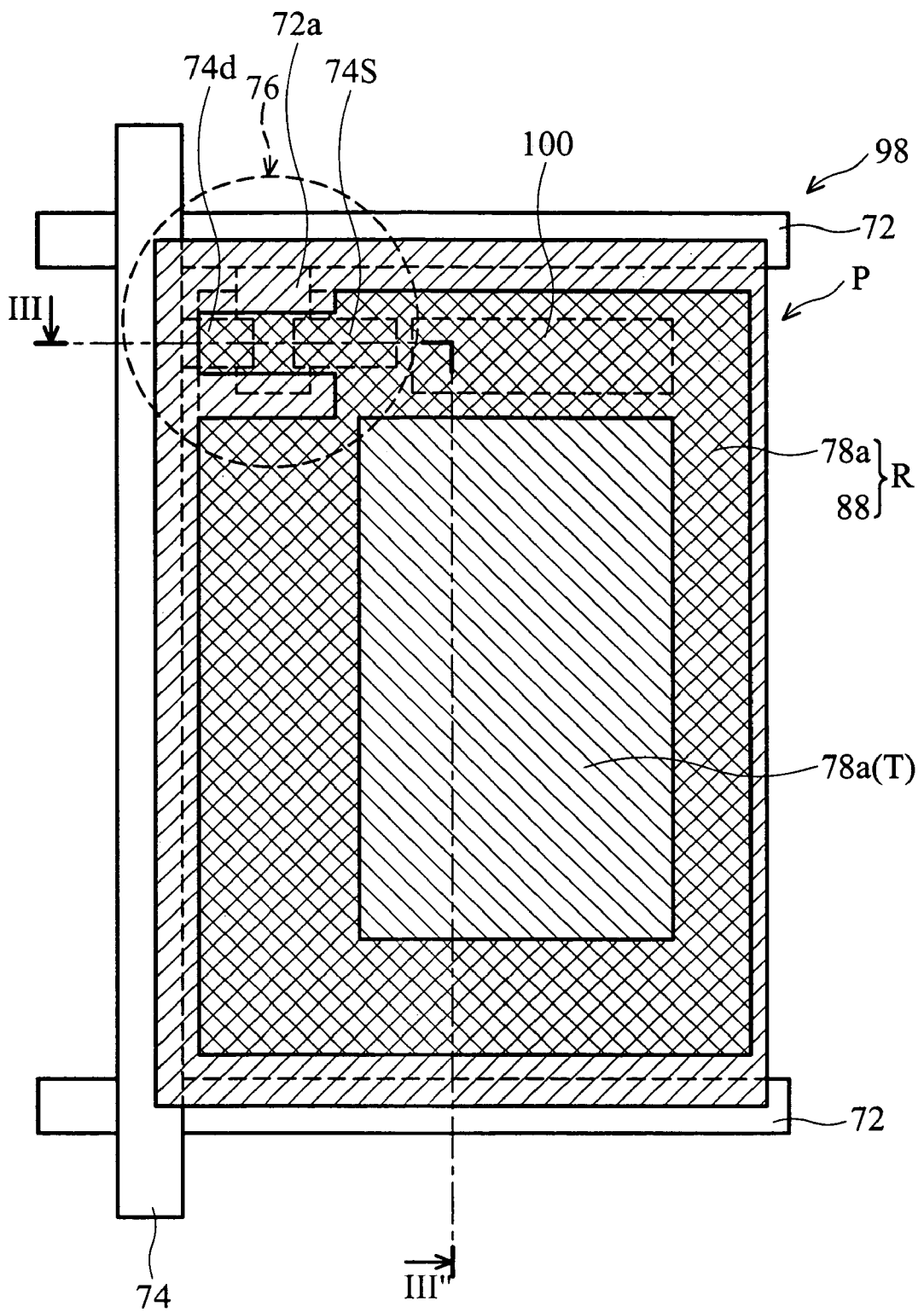
FIG. 7B is a plane view of the TFT substrate of the transflective liquid crystal display in accordance with a fifth embodiment of the present invention.

FIG. 7A is a cross section of the transflective liquid crystal display 98 in accordance with a fifth embodiment of the present invention. FIG. 7B is plane view of the transparent electrode and the reflective electrode of a TFT substrate of a transflective liquid crystal display 98 according to a fifth embodiment of the present invention, wherein FIG. 7A is taken along line III-III" of FIG. 7B.

The transflective TFT-LCD device 98 is nearly identical to the transflective TFT-LCD device 60 of the first embodiment as shown in FIG. 3A and for simplicity its detailed description is omitted. The fifth embodiment is different from the first embodiment in that the reflective TFT-LCD 98 further comprises a storage electrode 100 on the same level with the gate electrode 72a adjacent to TFT device 76. The overlap of the storage electrode 100 and transparent electrode 78a thereunder forms a capacitor. The fabrication method is different in that the first conductive layer is defined into a scan line 72, a gate electrode 72a, and a storage electrode 100 simultaneously.

Sixth Embodiment

Figure 8:
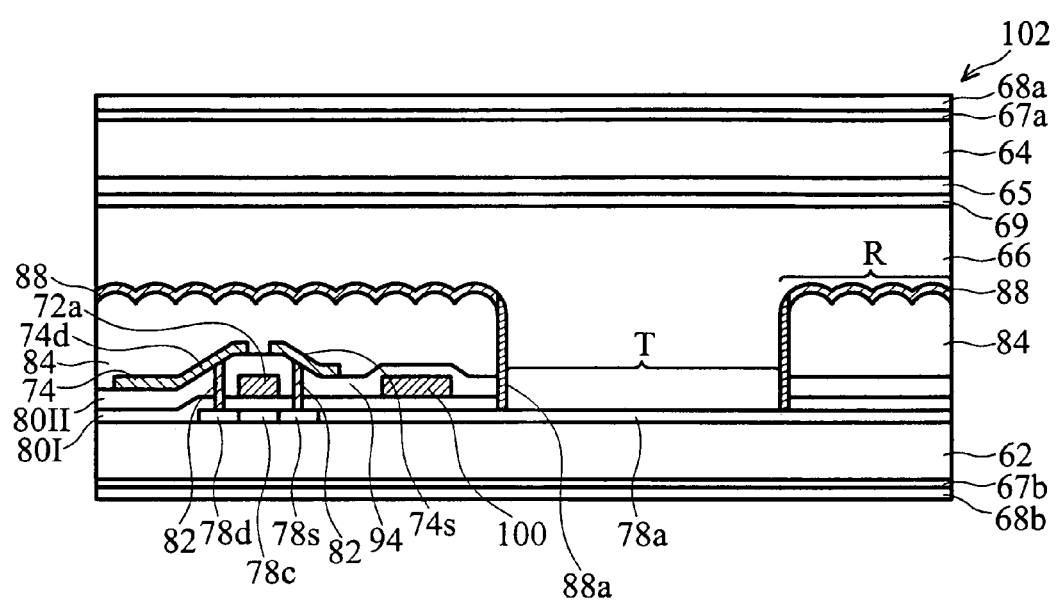
FIG. 8 is a cross section of the transflective liquid crystal display in accordance with a sixth embodiment of the present invention.

FIG. 8 is a cross section of the transflective liquid crystal display 102 in accordance with a sixth embodiment of the present invention. The transflective TFT-LCD device 102 is nearly identical to the transflective TFT-LCD device 90 of the second embodiment as shown in FIG. 4 and for simplicity its detailed description is omitted. The sixth embodiment is different from the second embodiment in that the reflective TFT-LCD 102 further comprises a storage electrode 100 on the same level with the gate electrode 72a adjacent to TFT device 76. The overlap of the storage electrode 100 and transparent electrode 78a thereunder forms a capacitor. The fabrication method is different in that the first conductive layer is defined into a scan line 72, a gate electrode 72a, and a storage electrode 100 simultaneously.

Seventh Embodiment

Figure 9A:
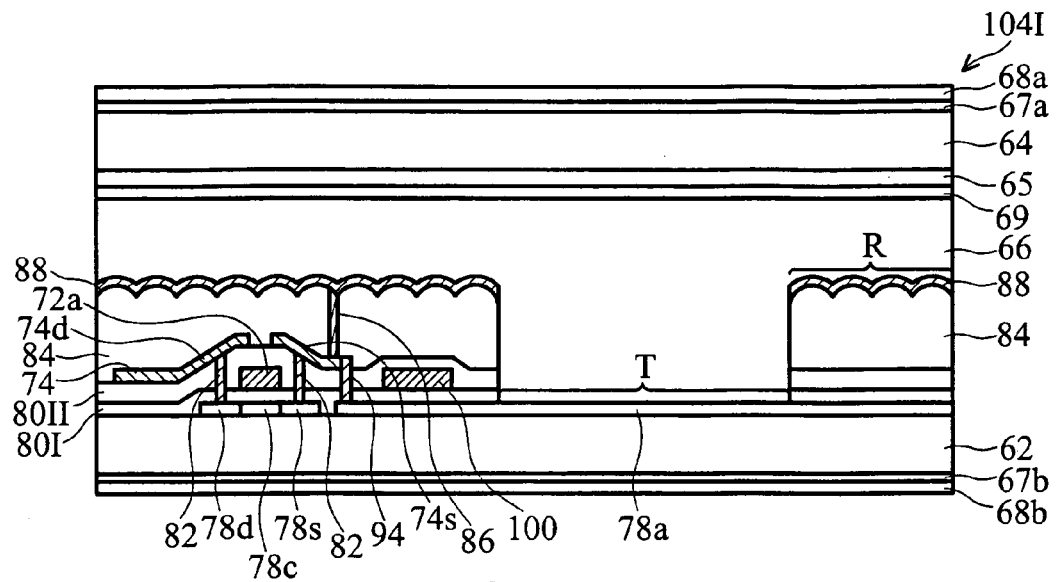
FIG. 9A is a cross section of a first transflective liquid crystal display in accordance with a seventh embodiment of the present invention.
Figure 9B:
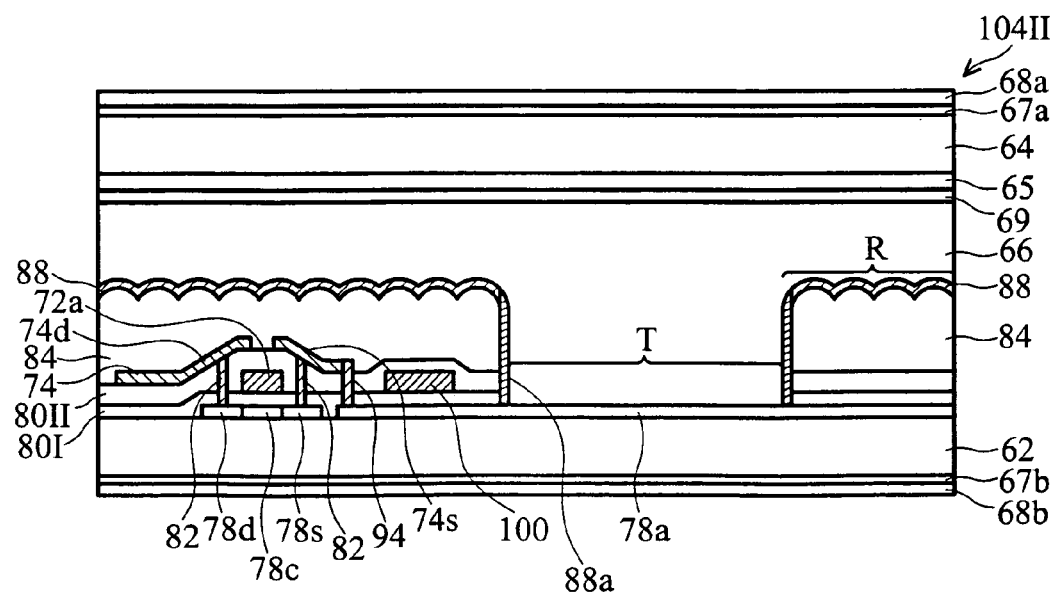
FIG. 9B is a cross section of a second transflective liquid crystal display in accordance with a seventh embodiment of the present invention.

FIG. 9A is a cross section of the transflective liquid crystal display 104I in accordance with a seventh embodiment of the present invention. FIG. 9B is a cross section of another transflective liquid crystal display 104II in accordance with a seventh embodiment of the present invention. The transflective TFT-LCD devices 104I and 104II are nearly identical to the transflective TFT-LCD device 92I and 92II of the third embodiment as shown in FIG. 5A and for simplicity their detailed description is omitted. The seventh embodiment is different from the third embodiment in that the reflective TFT-LCD devices 104I and 104II further comprise a storage electrode 100 on the same level with the gate electrode 72a adjacent to TFT device 76. The overlap of the storage electrode 100 and transparent electrode 78a thereunder forms a capacitor. The fabrication method is different in that the first conductive layer is defined into a scan line 72, a gate electrode 72a, and a storage electrode 100 simultaneously.

Eighth Embodiment

Figure 10A:
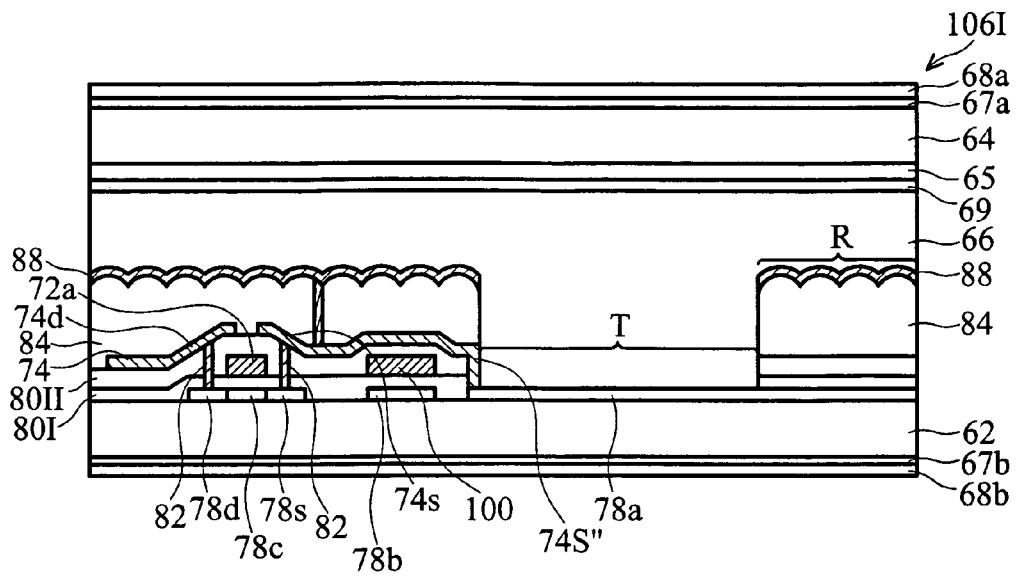
FIG. 10A is a cross section of a first transflective liquid crystal display in accordance with a eighth embodiment of the present invention.
Figure 10B:
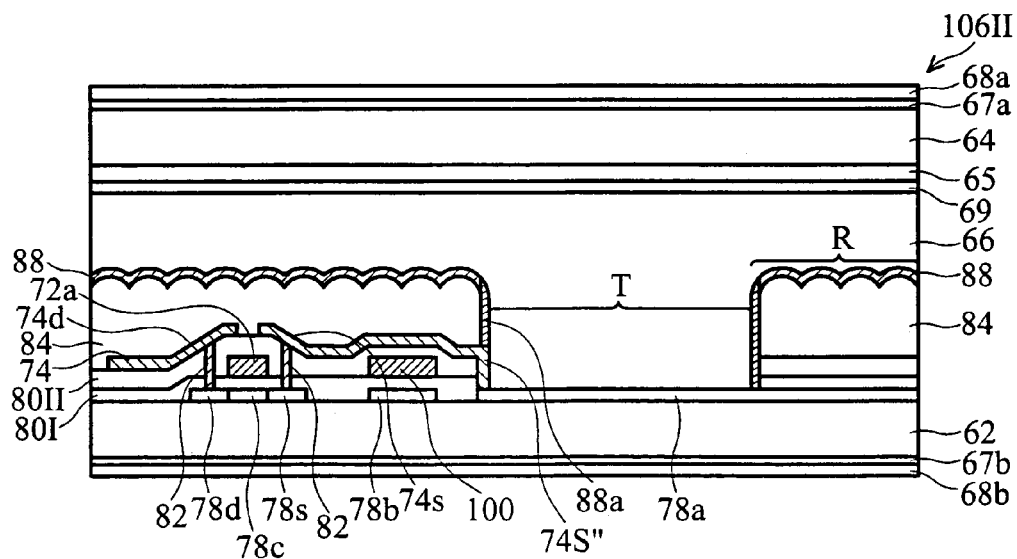
FIG. 10B is a cross section of a second transflective liquid crystal display in accordance with a eighth embodiment of the present invention.

FIG. 10A is a cross section of the transflective liquid crystal display 106I in accordance with an eighth embodiment of the present invention. FIG. 10B is a cross section of another transflective liquid crystal display 106II in accordance with an eighth embodiment of the present invention. The transflective TFT-LCD devices 106I and 106II are nearly identical to the transflective TFT-LCD device 96I and 96II of the fourth embodiment as shown in FIG. 6A and for simplicity their detailed description is omitted. The eighth embodiment is different from the fourth embodiment in that the reflective TFT-LCD devices 106I and 106II further comprise a storage electrode 100 on the same level with the gate electrode 72a adjacent to TFT device 76. The overlap of the storage electrode 100 and transparent electrode 78a thereunder forms a capacitor. The fabrication method is different in that the first conductive layer is defined into a scan line 72, a gate electrode 72a, and a storage electrode 100 simultaneously.

Ninth Embodiment

Figure 11A:
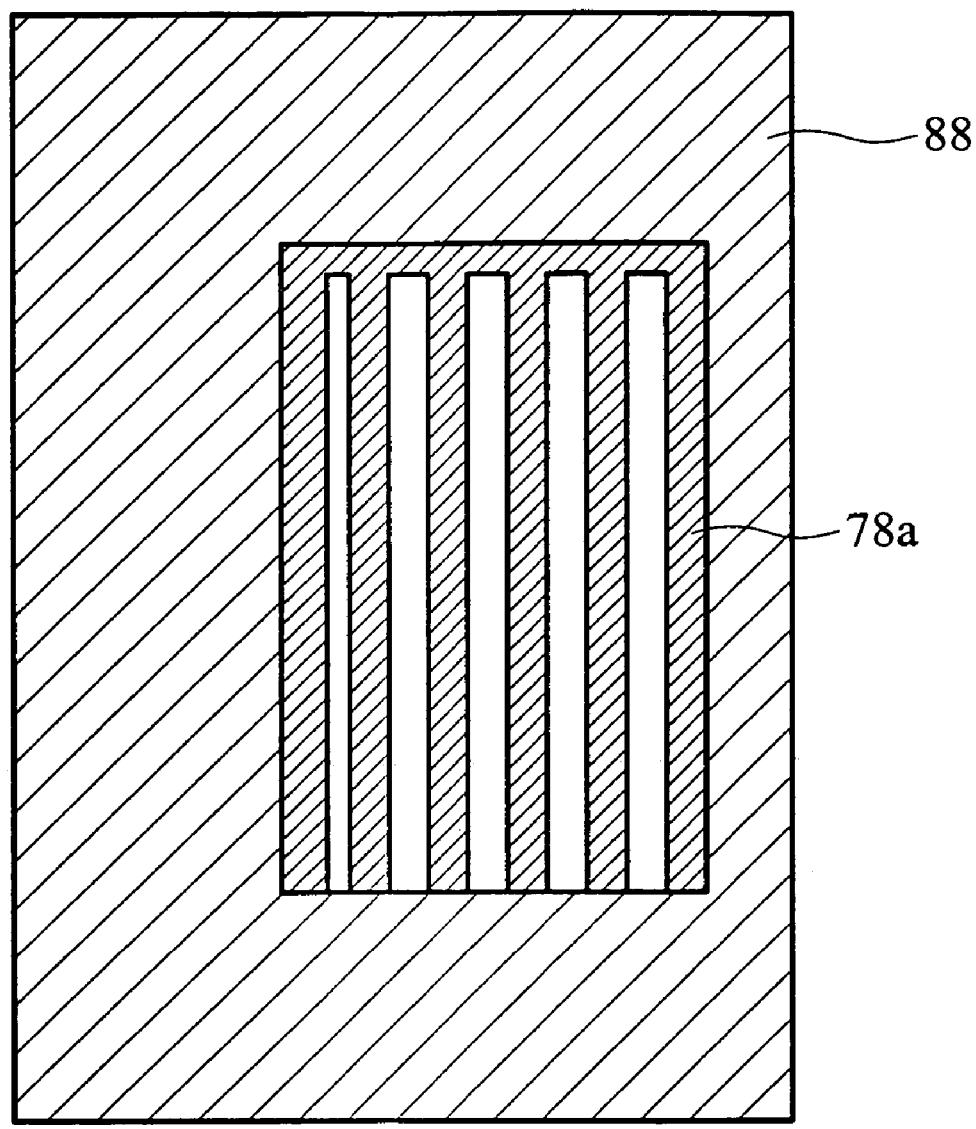
FIG. 11A is a plane view of a first transparent electrode in accordance with a ninth embodiment of the present invention.
Figure 11B:
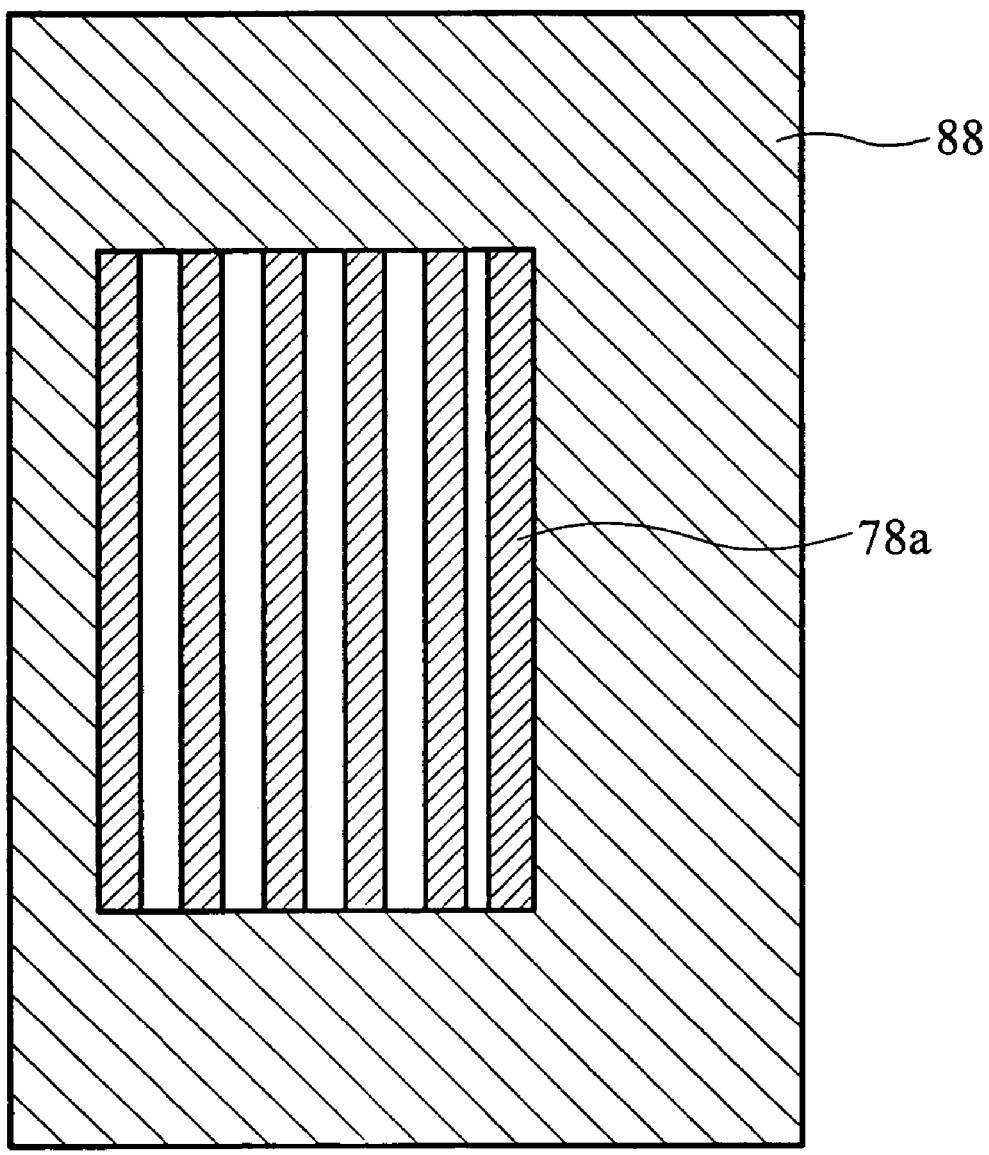
FIG. 11B is a plane view of a second transparent electrode in accordance with a ninth embodiment of the present invention.

The transparent electrode 78a according to the ninth embodiment of the present embodiment includes comb shaped or stripe shaped electrodes for improving the transmittance of the transparent electrode 78a. FIG. 11A is a plane view of a transparent electrode in accordance with a ninth embodiment of the present invention. FIG. 11B is a plane view of another transparent electrode in accordance with a ninth embodiment of the present invention.

Referring to FIG. 11A, when patterning the silicon layer 78, the transparent electrode 78a is defined into a comb shape. Each strip of the transparent electrode 78a is electrically connected. Since the transparent electrode 78a does not directly connect the reflective electrode 88, it is applicable in the aforementioned structures as shown in FIGS. 3A, 5A, 6A, 7A, 9A, and 10A.

In FIG. 11B, when patterning the silicon layer 78, the transparent electrode 78a is defined into separated stripes. Since each stripe of the transparent electrode 78a must directly connect the reflective electrode 88, it is applicable in the aforementioned structures as shown in FIGS. 4, 5B, 6B, 7B, 8, 9B, and 10B.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A transflective liquid crystal display comprising:
   a lower substrate and an upper substrate opposing each other;
   a plurality of pixel regions on the lower substrate;
   a thin film transistor having a silicon layer;
   a transparent electrode formed in the pixel region, wherein the transparent electrode is conductively connected to the thin film transistor; and
   a reflective electrode formed over a portion of the transparent electrode, wherein the reflective electrode is conductively connected to the same thin film transistor;
   wherein the overlap of the reflective electrode and the transparent electrode forms a reflective region and the non-overlapping region of the reflective electrode and the transparent electrode form a transmissive region; and
   the transparent electrode is a conductive silicon layer formed from the same layer as the silicon layer of the thin film transistor.

2. The display as claimed in claim 1, wherein the silicon layer comprises at least one of a polysilicon layer, an amorphous silicon layer, a doped silicon layer, and an un-doped silicon layer.

3. The display as claimed in claim 1, further comprising:
   a thin film transistor device comprising a gate electrode, a source and a drain region on the lower substrate;
   a first insulating layer, formed on the silicon layer;
   a second insulating layer formed on the first insulating layer covering the gate electrode;
   a drain electrode, formed on the second insulating layer and overlying the drain region, wherein the drain electrode is an extension of the data line;
   a source electrode, formed on the second insulating layer and overlying the source region;
   a first contact plug, perforating through the second insulating and first insulating layers to electrically connect the source electrode and the source region; and
   an passivation insulating layer, formed on the second insulating layer and overlying the source electrode and the drain electrode;
   wherein the first insulating layer, the second insulating layer, and the passivation insulating layer expose the transparent electrode in the transimissive region; and the reflective electrode is formed on the passivation insulating layer.

4. The display as claimed in claim 3, further comprising:
   a second contact plug, perforating through the passivation insulating layer, thereby forming an interconnect between the source electrode and the reflective electrode;
   wherein the source region electrically connects the transparent electrode, and the reflective electrode electrically connects the transparent electrode via the second contact plug, the source electrode, the first contact plug, and the source region.

5. The display as claimed in claim 3, further comprising:
   an extension of the reflective layer, comformally extended from the sidewall of the passivation insulating layer to the transparent electrode, thereby forming an electrical connection;
   wherein the source region connects the transparent electrode, and the source electrode electrically connects the reflective electrode via the first contact plug, the source region, and the transparent electrode.

6. The display as claimed in claim 3, further comprising:
   a second contact plug, perforating through the passivation insulating layer, thereby forming an interconnect between the source electrode and the transparent electrode; and
   a third contact plug, perforating through the second insulating layer and the passivation insulating layer, thereby forming an interconnect between the source electrode and the transparent electrode;
   wherein the source region is separated from the transparent electrode, and the reflective electrode electrically connects the transparent electrode via the second contact plug, the source electrode, and the third contact plug.

7. The display as claimed in claim 3, further comprising:
   an extension of the reflective electrode, comformally extended from the sidewall of the passivation insulating layer to the transparent electrode, thereby forming an electrical connection; and
   a third contact plug, perforating the second insulating layer and the passivation insulating layer, thereby forming an interconnect between the source electrode and the transparent electrode;
   wherein the source region is separated from the transparent electrode, and the reflective electrode electrically connects the transparent electrode via the second contact plug, the source electrode, and the third contact plug.

8. The display as claimed in claim 3, further comprising:
   a second contact plug, perforating through the passivation insulating layer, thereby forming an interconnect between the source electrode and the reflective electrode;
   an extension of the source electrode, comformally extended from the sidewall of the second insulating layer to the transparent electrode, thereby forming an electrical connection; and
   wherein the source region is separated from the transparent electrode, and the reflective electrode electrically connects the transparent electrode via the second contact plug, the source electrode, and the third contact plug.

9. The display as claimed in claim 3, further comprising:
   an extension of the source electrode, comformally extended from the sidewall of the second insulating layer to the transparent electrode, thereby forming an electrical connection;
   an extension of the reflective electrode, comformally extended from the sidewall of the passivation insulating layer to the transparent electrode, thereby forming an electrical connection; and
   wherein the source region is separated from the transparent electrode, and the reflective electrode electrically connects the transparent electrode via the second contact plug, the source electrode, and the third contact plug.

10. The display as claimed in claim 3, further comprising:
a storage electrode, interposed between the first insulating layer and the second insulating layer, and adjacent to the thin film transistor;
wherein the storage electrode is at the same level with the gate electrode, and an overlap of the storage electrode and the transparent electrode forms a capacitor.

11. The display as claimed in claim 1, wherein the transparent electrode of the transmissive region is comb-shaped.

12. The display as claimed in claim 1, wherein the transparent electrode of the transimissive region is a plurality of separated stripes.

13. The display as claimed in claim 1, wherein in the reflective region, the transparent electrode extends between the reflective electrode and the lower substrate.

14. The display as claimed in claim 1, wherein the silicon layer of the thin film transistor and the transparent electrode are at a same layer structure level.

15. A method for fabricating a transflective liquid crystal display, comprising steps of:
providing a substrate, comprising a plurality of pixels with a transmissive region and a reflective region;
forming a silicon layer on the pixels;
forming a first insulating layer on the substrate covering the silicon layer;
forming a first conductive layer on the first insulating layer, and defining the first conductive layer into at least two scan lines and a gate electrode;
forming a thin film transistor comprising a doped silicon layer by the side of the gate electrode, wherein the doped silicon at one side of the gate electrode serves as a drain region, the doped silicon at the other side of the gate electrode serves as a source region, and the doped silicon covering a large portion of the pixels serves as a transparent electrode, and wherein the transparent electrode is conductively connected to the thin film transistor;
forming a second insulating layer on the first insulating layer covering the gate electrode;
forming a first contact plug, perforating through the second insulating layer and the first insulating layer to the source and drain region;
forming a second conductive layer on the second insulating layer, and defining the second conductive layer into at least two data lines, a drain electrode, and a source electrode, wherein the data lines and the scan lines intersect and form a pixel region;
forming a passivation insulating layer on the second insulating layer covering the data lines, the drain electrode, and the source electrode;
removing a portion of the passivation insulating layer, the second insulating layer, and the first insulating layer exposing the transparent electrode; and
forming a reflective electrode on the passivation insulating layer, wherein the reflective electrode is located within the reflective region, and conductively connected to the same thin film transistor.

16. The method as claimed in claim 15, wherein the silicon layer comprises a polysilicon layer or an amorphous layer.

17. The method as claimed in claim 15, further comprising a step of:
forming a second contact plug, perforating through the passivation insulating layer, thereby forming an interconnect between the source electrode and the reflective electrode.

18. The method as claimed in claim 15, further comprising a step of:
forming an extension of the reflective layer comformally extended from the sidewall of the passivation insulating layer to the transparent electrode to serve as an electrical connection.

19. The method as claimed in claim 15, further comprising steps of:
forming a second contact plug perforating through the passivation insulating layer, thereby forming en interconnect between the source electrode and the reflective electrode; and
forming a third contact plug, perforating through the second insulating layer and the first insulating layer, thereby forming an interconnect between the source electrode and the transparent electrode.

20. The method as claimed in claim 15, wherein the source region is separated from the transparent electrode, further comprising:
forming an extension of the reflective electrode, comformally extended from the sidewall of the passivation insulating layer to the transparent electrode, thereby fanning an electrical connection; and
forming a third contact plug, perforating through the second insulating layer and the passivation insulating layer, thereby forming an interconnect between the source electrode and the transparent electrode.

21. The method as claimed in claim 15, wherein the source region is separated from the transparent electrode, further comprising steps of:
forming a second contact plug, perforating through the passivation insulating layer, thereby forming an interconnect between the source electrode and the reflective electrode; and
forming an extension of the source electrode, comformally extended from the sidewall of the second insulating layer to the transparent electrode, thereby forming an electrical connection.

22. The method as claimed in claim 15, wherein the source region is separated from the transparent electrode, further comprising steps of:
forming an extension of the source electrode, comformally extended from the sidewall of the second insulating layer to the transparent electrode, thereby forming an electrical connection; and
forming an extension of the reflective electrode, comformally extended from the sidewall of the passivation insulating layer to the transparent electrode, thereby forming electrical connection.

* * * * *